US011890867B2

(12) United States Patent
Ruhm

(10) Patent No.: US 11,890,867 B2
(45) Date of Patent: Feb. 6, 2024

(54) MODULAR MULTI ENHANCEMENT PRINTING SYSTEM

(71) Applicant: SCODIX LTD., Rosh Ha'ayin (IL)

(72) Inventor: Benji Ruhm, Tel-Aviv (IL)

(73) Assignee: SCODIX LTD., Rosh Hayayin (IL)

( * ) Notice: Subject to any disclaimer, the term of this patent is extended or adjusted under 35 U.S.C. 154(b) by 342 days.

(21) Appl. No.: 17/265,555

(22) PCT Filed: Jul. 31, 2019

(86) PCT No.: PCT/IL2019/050865
§ 371 (c)(1),
(2) Date: Feb. 3, 2021

(87) PCT Pub. No.: WO2020/026244
PCT Pub. Date: Feb. 6, 2020

(65) Prior Publication Data

US 2021/0300088 A1 Sep. 30, 2021

Related U.S. Application Data

(60) Provisional application No. 62/714,092, filed on Aug. 3, 2018.

(51) Int. Cl.
*B41J 13/22* (2006.01)
*B41J 2/21* (2006.01)
*B41J 11/00* (2006.01)

(52) U.S. Cl.
CPC ............... *B41J 13/226* (2013.01); *B41J 2/21* (2013.01); *B41J 11/0015* (2013.01)

(58) Field of Classification Search
CPC ........ B41J 13/226; B41J 2/21; B41J 11/0015; B41J 3/60; B41J 13/223
See application file for complete search history.

(56) References Cited

U.S. PATENT DOCUMENTS

2008/0179828 A1* 7/2008 Yraceburu ............... B65H 5/12 271/276
2017/0348969 A1* 12/2017 Chiba .................... B41J 11/007

OTHER PUBLICATIONS

Gazzani, Mario, Method for Manufacturing Laminated Printed Tapes and Machine for Its Execution, Feb. 15, 2018, CA, All Pages (Year: 2018).*

* cited by examiner

*Primary Examiner* — Justin Seo
*Assistant Examiner* — Tracey M McMillion
(74) *Attorney, Agent, or Firm* — AlphaPatent Associates Ltd.; Daniel J. Swirsky

(57) ABSTRACT

The subject matter discloses a printing enhancement system, comprising one or more printing enhancement modules configured to perform a printing enhancement operation on a substrate, a drum configured to carry the substrate, said drum is connected to a drum actuation mechanism configured to move the drum at a rotational movement, a processing module coupled to the drum actuation mechanism and to the one or more printing enhancement modules, wherein the processing module sends commands to the drum actuation mechanism to move the drum and sends commands to the one or more printing enhancement modules to dispense the materials according to a printing enhancement task, wherein the one or more printing enhancement modules are arranged around a circumference of the drum, wherein the rotational movement enables to bring the substrate closer to a selected printing enhancement module of the one or more printing enhancement modules.

17 Claims, 6 Drawing Sheets

FIG. 1 – PRIOR ART

MODULAR MULTI ENHANCEMENT PRINTING SYSTEM

FIELD OF THE INVENTION

The present invention relates to the field of digital printing enhancement and more particularly multiple enhancement options provided by a single modular system.

BACKGROUND OF THE INVENTION

Overprinting is the intentional printing of one or more layers of ink, or other such printing media, on top of another, for example by coating or varnishing. In this manner, a previously printed media can be enhanced, for example, with a glossy finish. The overprint or overcoat can be on the entire media or substrate, on one or more features previously printed on the substrate or be printed adjacent to previously printed features, or any combination of these.

To print on specific features and produce a high quality overprint, it is critical that the overprint ink be accurately applied on the substrate. For this purpose, the overprint coating applicator, for example, an ink-jet nozzle, must be accurately aligned with the features to be coated.

Printing enhancement modules used to perform the enhancement task include inkjets that dispense ink onto the substrate and curing modules that cure the dispensed inkjet. Standard printing enhancement system contains multiple inkjets for dispensing different materials onto the substrate, the multiple inkjets are arranged in a linear configuration, along an elongated conveyor that moves the substrate from one inkjet to another, according to the commands included in the printing enhancement task. At the end of the elongated conveyor, the printing enhancement system contains a collector, such as an output tray, configured to store the substrate after the enhancement task is complete.

SUMMARY OF THE INVENTION

A printing enhancement system, comprising one or more printing enhancement modules configured to perform a printing enhancement operation on a substrate a drum configured to carry the substrate, said drum is connected to a drum actuation mechanism configured to move the drum at a rotational movement, a processing module coupled to the drum actuation mechanism and to the one or more printing enhancement modules, wherein the processing module sends commands to the drum actuation mechanism to move the drum and sends commands to the one or more printing enhancement modules to dispense the materials according to a printing enhancement task, wherein the one or more printing enhancement modules are arranged around a circumference of the drum; wherein the rotational movement enables to bring the substrate closer to a selected printing enhancement module of the one or more printing enhancement modules.

In some cases, the printing enhancement system further comprises a printing enhancement module actuator configured to move at least one of the one or more printing enhancement modules. In some cases, the drum comprises a top surface, a bottom surface and the circumference, wherein an axis of the rotational movement is perpendicular to the top surface.

In some cases, the one or more printing enhancement modules are arranged within a predefined distance from a center of the top surface. In some cases, the top surface is of a circular shape. In some cases, the substrate is secured to the circumference of the drum. In some cases, the printing enhancement system further comprises grippers configured to grip the substrate to the circumference of the drum. In some cases, the printing enhancement system further comprises a suction unit configured to suck air from apertures located at the circumference of the drum.

In some cases, the one or more printing enhancement modules comprise one or more inkjets and one or more curing modules. In some cases, the one or more inkjets comprise an adhesive printer. In some cases, the one or more inkjets comprise a color printer.

In some cases, the printing enhancement system further comprising a priming station configured to prime the substrate. In some cases, the printing enhancement system further comprises an input tray for inputting substrates into the drum. In some cases, the printing enhancement system further comprising an output tray for receiving the substrate after the printing enhancement task is complete.

In some cases, the printing enhancement system further comprising a duplex module coupled to the output tray, said duplex module is configured to receive the substrate after the printing enhancement task is complete on one side of the substrate, and transfer the substrate to the input tray in a manner that enables to perform the printing enhancement task on a second side of the substrate. In some cases, at least one of the one or more printing enhancement modules is a digital printing module. In some cases, at least one of the one or more printing enhancement modules is a foil-based printing module.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF THE INVENTION

The subject matter discloses a printing enhancement system having multiple enhancement modules arranged in a circular configuration. Prior art printing enhancement systems arrange the multiple enhancement modules arranged in a linear configuration, which results in a larger footprint for the printing enhancement system. The large footprint results in extensive shipping costs, more room required to store the printing enhancement system at the client's residence and additional properties that make the printing enhancement system more complex to manufacture, more expensive to manufacture and more expensive to maintain.

Figure 1:
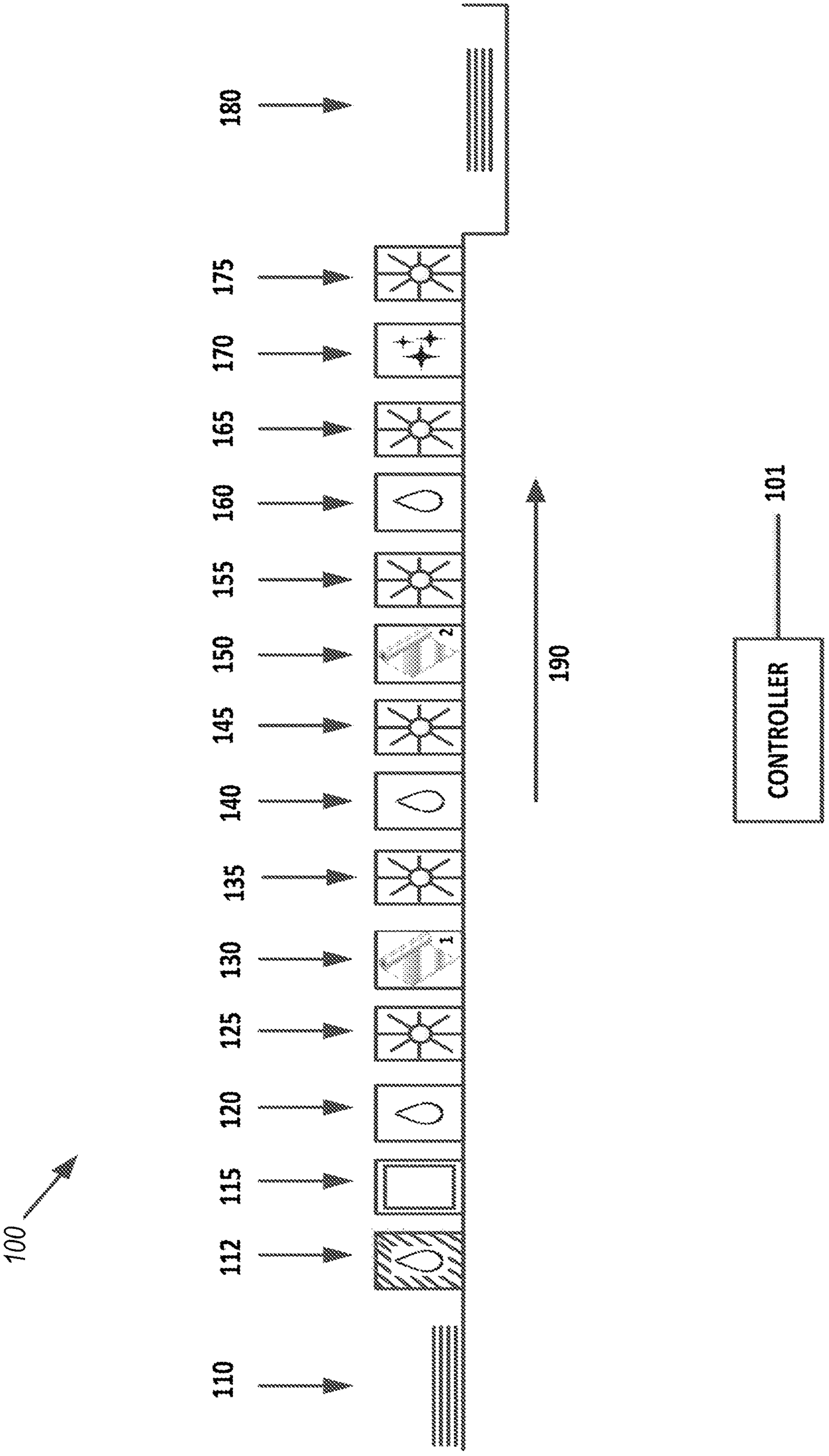
FIG. 1 schematically shows a printing system for performing a printing enhancement task, according to prior art configurations.

FIG. 1 schematically shows a printing system for performing a printing enhancement task, according to prior art configurations. As noted above, prior art configurations disclose arranging the printing enhancement modules in a linear manner. The printing enhancement system 100 comprises a plurality of printing enhancement modules, with the substrate moving along the stations in the direction of arrow 190. The printing enhancement modules comprise modules that dispense materials onto the substrate, and modules that apply radiation onto the substrate, for example to cure the dispensed materials. The printing enhancement system 100 comprises an input tray and automatic paper feeder 110 configured to feed the conveyor with sheets of the substrate. The printing enhancement system 100 comprises one or more inkjets 120, 140, 160 for dispensing materials onto the substrate or on another layer of material already dispensed and cured on the substrate. The material may be polymer or any other type of ink or dispensable polymer desired by a person skilled in the art. The printing enhancement system 100 comprises one or more curing modules 125, 135, 145, 155, 165, 175 configured to cure the materials dispensed onto the substrate. The materials may be ink, adhesives, glitter materials and the like. The curing modules may be implemented by applying radiation towards the substrate, for example ultraviolet (UV) illumination.

The printing enhancement system 100 also comprises a computerized controller 101 configured to manage the printing enhancement task according to predefined rules. The printing enhancement system 100 may also comprise a priming station 112 and a registration station 115. The printing enhancement system 100 may also comprise one or more foil stations 130, 150 for applying a foil to the partially cured adhesive. The printing enhancement system 100 may also comprise a glitter station 170 for dispersing glitter powder to partially cured adhesive material. The printing enhancement system 100 also comprises an unloading mechanism and output tray 180 for receiving the finished product after at least one phase of the printing enhancement is complete.

The printing enhancement system 100 comprises a memory module configured to store the information required to perform of objects during a printing enhancement task. The memory module and its sub-components may be stored inside the printing system 100 or in a memory module located in a remote device, or a combination thereof. The memory module is communicating with other modules of the printing system 100, and stores information received from at least some of the other modules, according to predefined rules, events and preferences.

Figure 2:
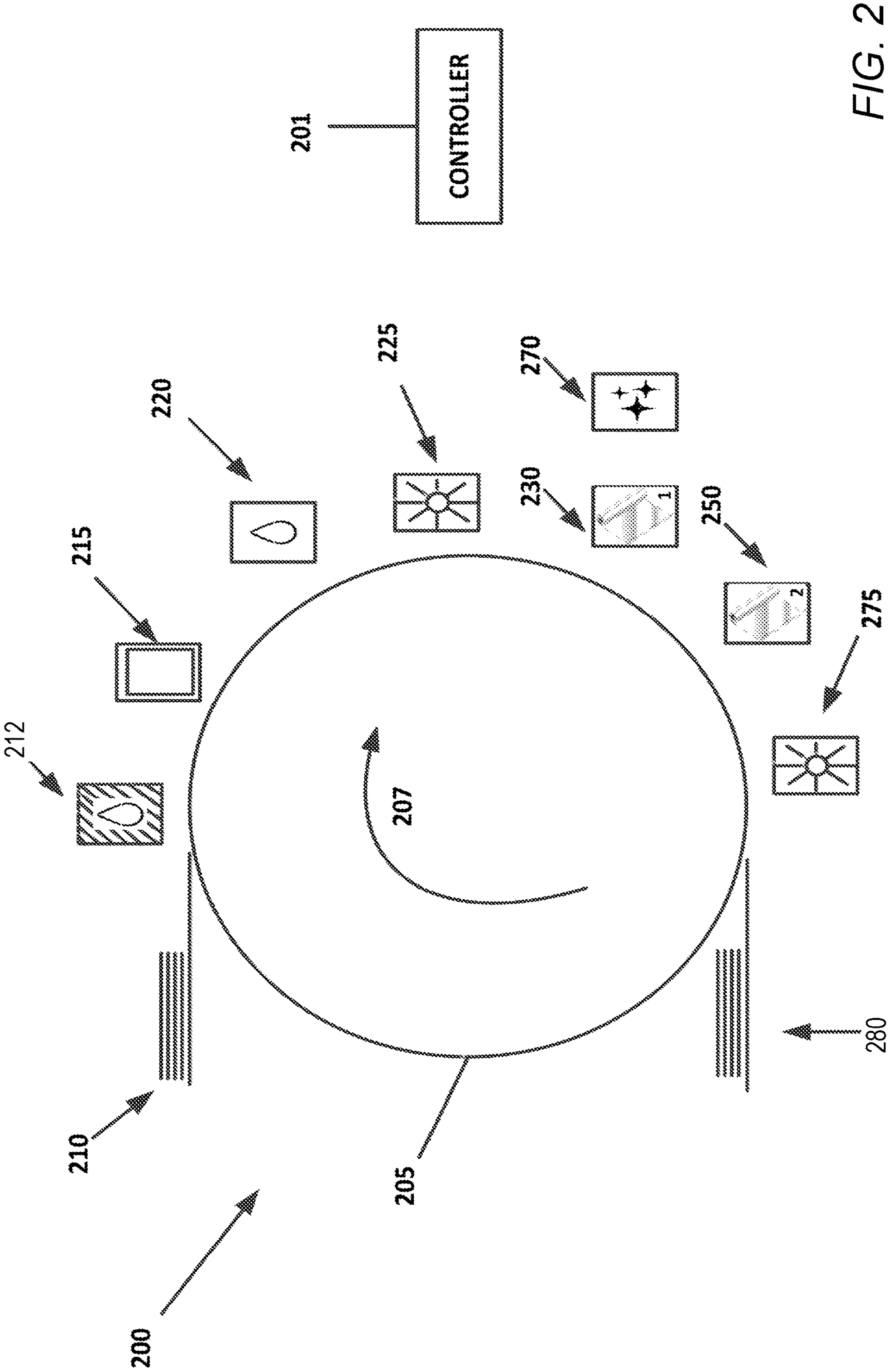
FIG. 2 schematically shows a layout of an exemplary printing enhancement system according to the present invention.

FIG. 2 schematically shows a layout of an exemplary printing enhancement system according to the present invention. The printing enhancement system 200 comprises a computerized controller 201, a drum 205 rotating in the direction marked by arrow 207, an input tray and automatic paper feeder 210. The substrate may be secured to a top surface or a circumference of the drum 205. The computerized controller 201 is configured to control the rotational movement of the drum 205 according to the printing enhancement task and a print enhancement station required to dispense material or radiation on the substrate.

The printing enhancement system 200 also comprises plurality of print enhancement stations (215, 220, 225, 230, 250, 270, and 275) mounted around the circumference of the drum 205 and an unloading mechanism and output tray 280 for receiving the finished product. The plurality of print enhancement stations are configured to alternate between various enhancement apparatuses (e.g. foil, glitters) according to commands from the computerized controller 201. It will be understood by persons skilled in the art that any number and any type of print enhancement stations (e.g. colorized polymer or overcoat or foil) may be mounted around the circumference of the drum 205. A station of the comprises plurality of print enhancement stations may be enabled by physically moving towards and away from the drum 205 by an actuator, as elaborated below.

The printing enhancement system 200 may also comprise a priming station 212 and a registration station 215. The printing enhancement system 200 may also comprise an additional enhancement station (250), e.g. a 2nd foil station, where the foil is stationed at a different angle to the substrate.

The exemplary printing enhancement system 200 is configured to perform the sequence of operations as described in conjunction with the system of FIG. 1 and comprises one or more inkjet printers 220 for dispensing an adhesive material (polymer) on the substrate. The one or more inkjet printers 220 may be located adjacent to the drum 205, or may be located in a distinct station in the printing enhancement system 200, before the substrate arrives at the drum 205. The printing enhancement system 200 also comprises one or more curing stations 225, 275 for curing the adhesive from the substrate. For example, first curing station 225 is configured to partially cure the adhesive and second curing station 275 is configured to totally cure the adhesive.

The number of revolutions performed by the drum 205 during a print enhancement operation depends on the number of layers required for the finished product and on the types and order of stations mounted around its circumference.

Figure 3:
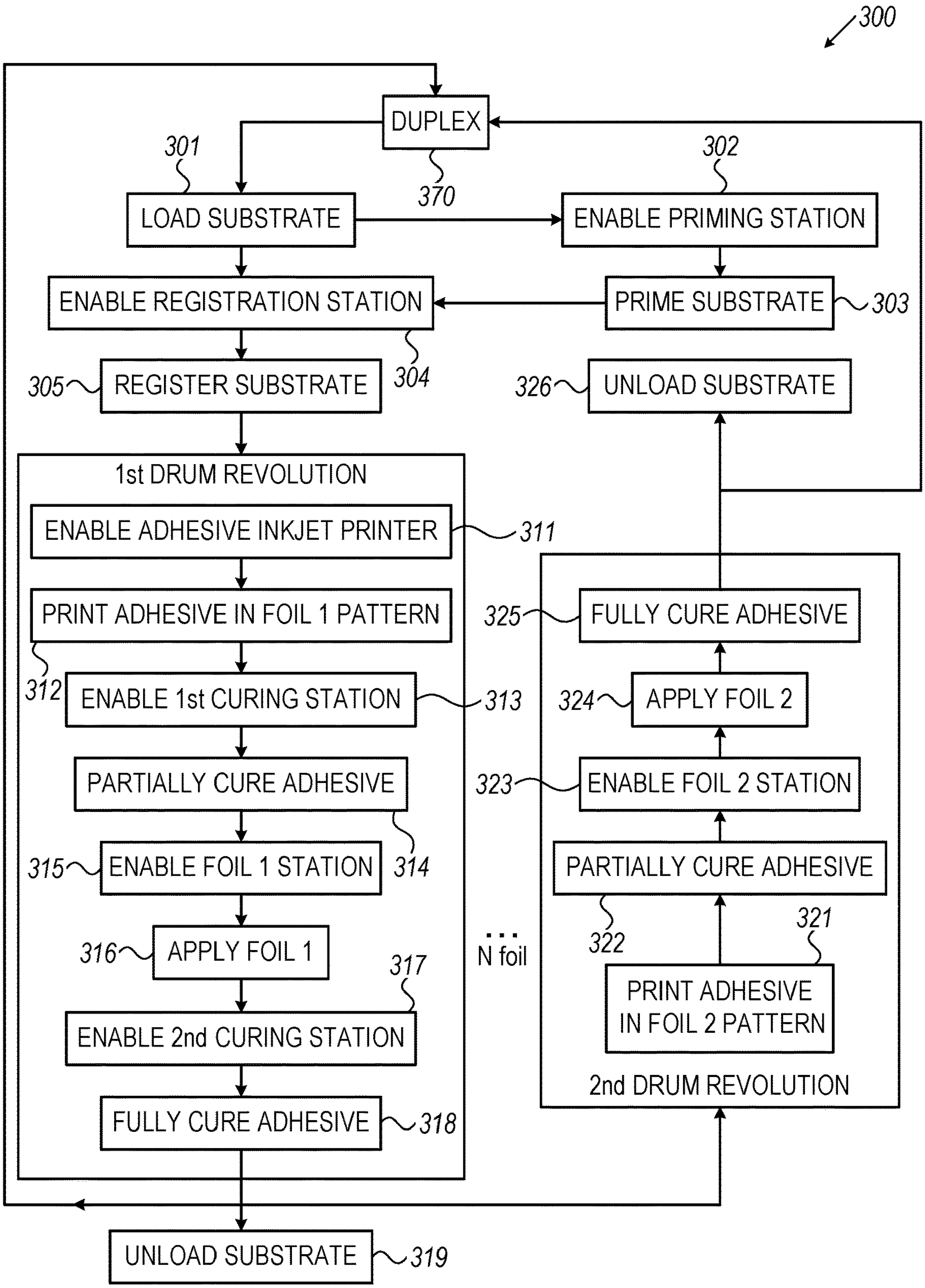
FIG. 3 shows a flowchart implementing an exemplary print enhancement method comprising one more drum revolutions.

FIG. 3 shows a flowchart implementing an exemplary print enhancement method comprising one more drum revolutions. Step 301 discloses loading the substrate by the automatic paper feeder from the input tray. The substrate may include the printed material thereon. Step 302 discloses enabling the priming station. Step 303 discloses performing a priming process in which the substrate is primed with a pre-coating material. Step 304 discloses enabling the registration station. Step 305 discloses performing substrate registration.

In some exemplary cases, the first drum revolution comprises the following processes, from step 311 to step 319. Step 311 discloses enabling the adhesive inkjet printer. Step 312 discloses enabling the adhesive inkjet printer printing adhesive in a pattern compatible with the first foil. Step 313 discloses enabling the 1st curing station. Step 314 discloses the first curing station partially cures the adhesive. Step 315 discloses enabling the first foil station. Step 316 discloses the first foil is applied to the partially cured adhesive. Step 317 discloses enabling the second curing station. Step 318 discloses the 2nd curing station fully cures adhesive on the substrate. Step 319 discloses unloaded the enhanced substrate by the unloading mechanism into output tray. In some other cases, the enhanced substrate may proceed for another revolution.

In some exemplary cases, the second drum revolution comprises the following processes, from step 321 to step 326. Step 321 discloses the adhesive inkjet printer printing adhesive in a pattern compatible with a second foil. Step 322 discloses the first curing station partially cures adhesive. Step 323 discloses enabling the second foil station. Step 324 discloses applying a second foil to the partially cured the adhesive. Step 325 discloses the second curing station fully curing the adhesive. Step 326 unloaded the enhanced substrate by the unloading mechanism into output tray. In some other cases, the enhanced substrate may proceed for another revolution.

In some exemplary embodiments, the number of foils used for the printing enhancement process is more than 2. In some exemplary cases, printing enhancement modules may be added around the circumference of the drum. In some exemplary cases, printing enhancement modules may be removed from the printing system of the subject matter.

in some exemplary embodiments, the printing enhancement system further comprising a duplex module 370 coupled to drum in a certain revolution. For example, after the first curing process 325, or after the second curing 325, the substrate may be transferred to the duplex module 370 or transferred to at least one of the output trays 319, 326. The duplex module 370 is configured to receive the substrate after the printing enhancement task is complete on one side of the substrate, to invert the substrate and transfer the substrate to the input tray 301 in a manner that enables to perform the printing enhancement task on a second side of the substrate.

In the exemplary embodiment of FIG. 3 several assumptions were made:

1. Two separate curing stations (225, 275) were used for partial and full curing. In alternative embodiments, the same curing (e.g. UV) station may be used by controlling the amount of radiation and the exposure time.
2. The registration station 215 has only been operated once, after substrate loading. In alternative embodiments the substrate may undergo registration at the beginning of each drum revolution or once every predefined number of revolutions have been completed.
3. At each drum revolution, the non-participating stations are disabled, e.g. by moving them away from the drum or by turning them off, depending on the station's technology and mounting architecture.

Figure 4:
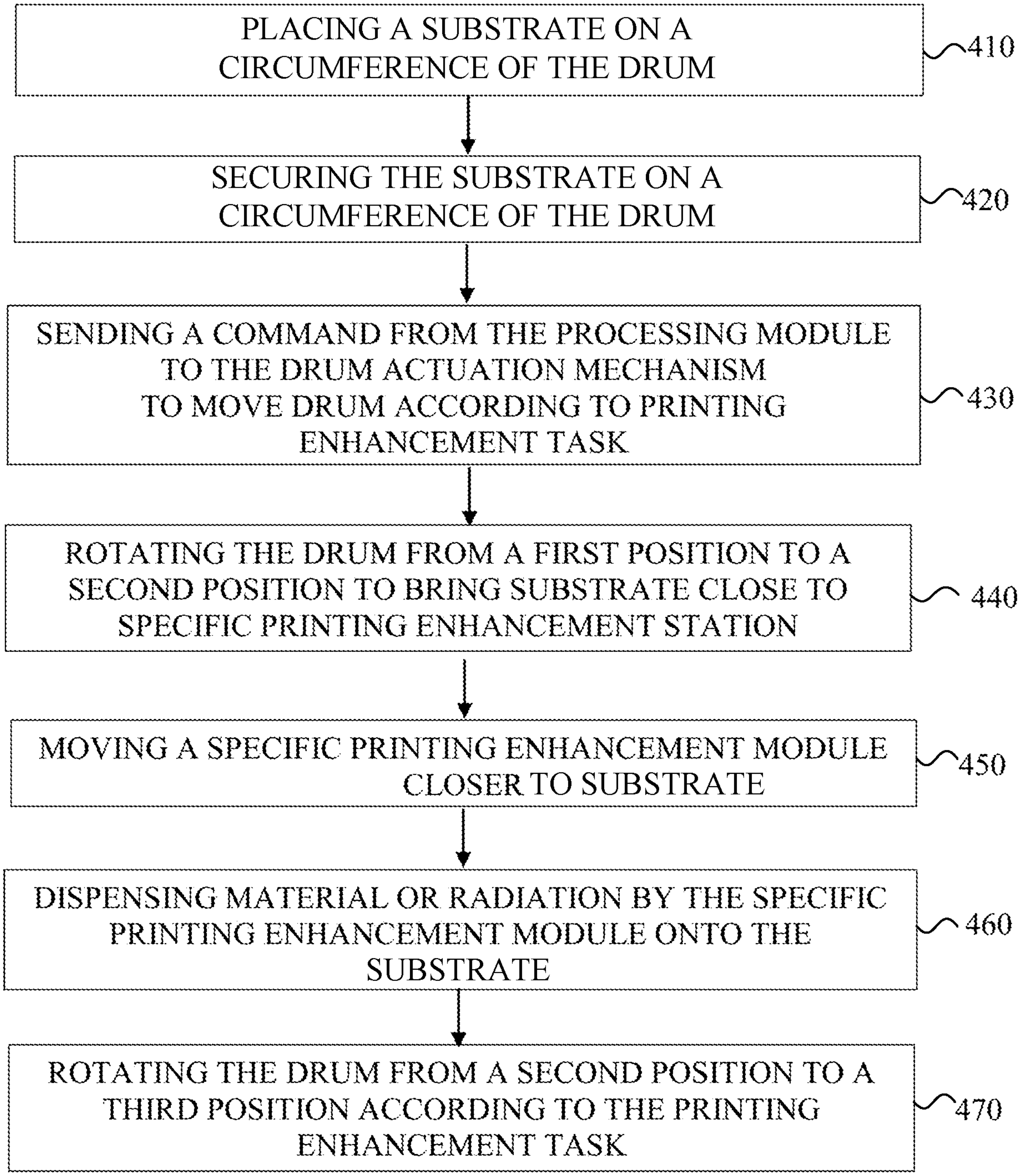
FIG. 4 shows a method of performing a printing enhancement task, according to exemplary embodiments of the subject matter.

FIG. 4 shows a method of performing a printing enhancement task, according to exemplary embodiments of the subject matter.

Step 410 discloses placing a substrate on a circumference of the drum. The top surface of the drum may be perpendicular to the ground, in order to enable placing the substrates on the circumference from an input tray in which the substrates are placed one on top of the other, for example as a stack of paper sheets. The size of the paper sheets may be desired by a person skilled in the art, such as A4, A3, and A2. The shape of the substrates may be polygonal, elliptical, and a combination thereof. The substrates may be pushed from the input tray in any method or mechanism desired by a person skilled in the art.

Step 420 discloses securing the substrate on a circumference of the drum. Securing the substrate may be defined as verifying that the substrate does not fall from the drum during the printing enhancement process, while the drum moves. Securing the substrate may be performed by closing grippers on the substrate. The grippers may be placed along the circumference of the drum, for example as pairs of grippers, one gripper of each pair is located closer to the top surface of the drum and another gripper of the pair is located closer to the bottom surface of the drum. The grippers may have an actuator for moving the grippers from one position in which the grippers secure the substrate to the drum, to another position in which the grippers enable removal of the substrate from the drum to the output tray. Securing the substrate to the drum may be performed by other mechanisms, for example a pump for sucking air via apertures in the circumference of the drum.

Step 430 discloses sending a command from the processing module to the drum actuation mechanism to move drum according to printing enhancement task. The printing enhancement task indicates the enhancement processes applied on the substrate, such as printing additional layers onto the printed substrate. The additional layers are dispensed by printing enhancement modules arranged generally around the circumference of the drum. The term around may indicate that the printing enhancement modules are located near the circumference of the drum. Some of the printing enhancement modules may be located over the drum. In some cases, all the printing enhancement modules may be located at an arc of 150 degrees, as the rest of the circumference, having 210 degrees, lacks any printing enhancement modules. The length of the arc may be defined by a person skilled in the art, for example according to the size of the drum, printing enhancement requirements, size and type of the printing enhancement modules and the like.

In some exemplary cases, the printing system comprises 6 printing enhancement modules, the printing enhancement modules comprise modules that dispense materials and modules that emit radiation that cures the materials on the substrate. The processing module sends a command to the drum to place the substrate closer to printing enhancement module #3. The command may indicate the number of degrees that the drum should rotate in order to place the substrate in optimal position relative to printing enhancement module #3. The command may also indicate the timing in which the drum should remain in the specific position, which corresponds to the printing enhancement task. For example, printing enhancement module #3 is configured to emit radiation for 0.25 seconds, after which the drum moves the substrate to the output tray, which is 128 degrees clockwise from the printing enhancement module #3.

In some cases, the drum may be configured to carry multiple substrates concurrently. For example, 4 substrates. The processing module may send commands to the drum actuation mechanism that considers the printing enhancement task to be performed on each of the substrates placed on the drum.

Step 440 discloses rotating the drum from a first position to a second position to bring substrate close to specific printing enhancement station. The specific printing enhancement station may be defined as close to a specific printing enhancement module. Rotation of the drum may be from one station to another, in a discrete manner, for example limited by teeth secured to the drum actuation mechanism. The drum may have 12 stations placed along 240 degrees of the entire circumference of the drum. In such case, the processing module may send a command to skip 2 stations and move 60 degrees to the subsequent station. In some other cases, the drum rotational movement is continuous, and not limited to specific locations along the circumference of the drum. For example, the processing module may send a command to move 48.5 degrees.

Step 450 discloses moving a specific printing enhancement module closer to the substrate. Movement of the specific printing enhancement station may be performed by an arm carrying the specific printing enhancement module. The timing, distance and direction of the printing enhancement module's movement may be determined by the processing module of the printing system. The arm may be connected to a power source, such as a battery, electricity grid, and the like. The arm may be secured to the housing of the printing system.

Step 460 discloses dispensing material or radiation by the specific printing enhancement module onto the substrate. The material may be dispensed from a distance in the range of 0.2-120 millimeters from the substrate. The material may be dispensed from a printing enhancement module located above the substrate, laterally from the substrate, or a combination thereof. The material may be ink, polymer, paint mixture as desired by a person skilled in the art. The radiation may cure the materials dispensed on the substrate, for example by illumination or by UV radiation.

Step 470 discloses rotating the drum from a second position to a third position according to the printing enhancement task. The third position may be a printing enhancement module, or an output tray from which substrate, after defined as a finished product, is removed from the drum.

Figure 5:
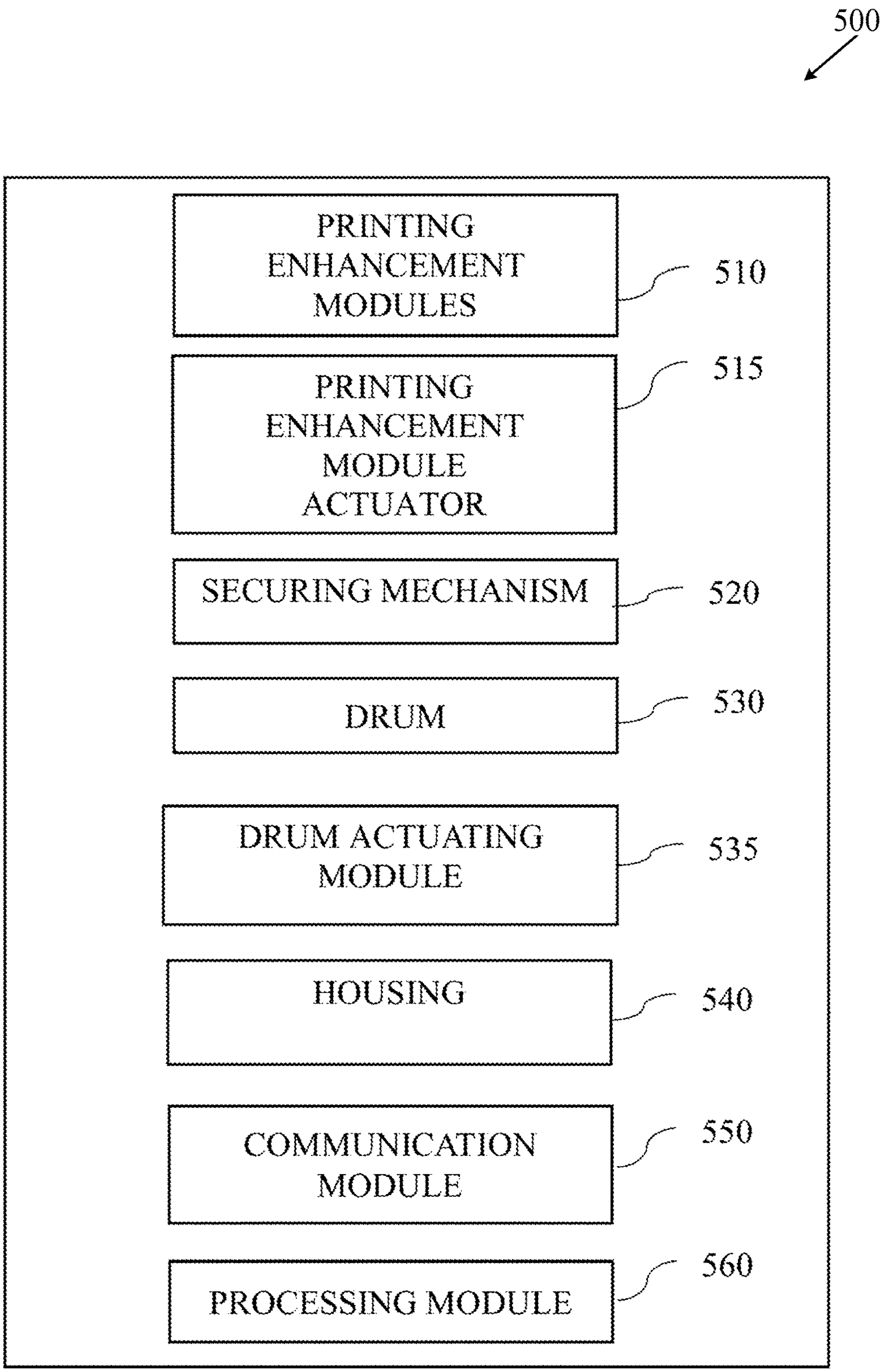
FIG. 5 shows a system for performing a printing enhancement task by rotating a drum on which the substrate is placed, according to exemplary embodiments of the subject matter.

FIG. 5 shows a system for performing a printing enhancement task by rotating a drum on which the substrate is placed, according to exemplary embodiments of the subject matter.

The printing machine 500 comprises one or more printing enhancement modules 510 arranged substantially around the circumference of the drum 530. The printing enhancement modules 510 may emit radiation to cure materials on the substrate, or dispense materials onto the substrate. In some cases, the one or more printing enhancement modules 510 comprise a digital printing module configured to emit material onto the substrate. In some cases, the one or more printing enhancement modules 510 comprise is a foil-based printing module configured to be in physical contact with the substrate and hence determine the shape of the material left on the substrate.

The printing enhancement modules 510 may be maneuvered towards and away from the drum 530 by printing enhancement module actuator 515. The printing enhancement module actuator 515 may be an arm coupled with a communication unit and a power source. The arm may be secured to a housing 540 of the printing system 500, said housing comprises a drum, a ceiling, sidewalls, and additional mechanisms, such as shelves, electrical circuitry and the like. The arm may maneuver a printing enhancement module 510 according to a command received from the processing module 560 of the printing system 500.

The processing module 560 is configured to manage the printing enhancement task performed by the printing system 500 using the rotatable drum 530. The processing module 560 receives the printing enhancement task from a communication module 550 of the printing system and generates commands to the printing enhancement module 510 and to the drum actuation mechanism 535 to move the drum 530 such that each substrate is brought closer to the appropriate printing stations that fit the printing enhancement task. The printing stations may be associated with specific printing enhancement modules 510. For example, printing station #4 is closest to printing enhancement module #6 which emits radiation, and printing station #3 is closest to printing enhancement module #5 which dispenses glitter materials. The processing module 560 may also send commands to a securing mechanism 520 configured to secure the substrate to the circumference of the drum 530. The command may be to secure the substrate or release the substrate to fall into the output tray. The securing mechanism 520 may move drumd on the commands from the processing module 560. The commands may also be sent via the communication module 550. The communication module 550 may work over a wireless or wired channel, such as Blue-tooth, Wi-fi, wired cables and the like.

Figure 6:
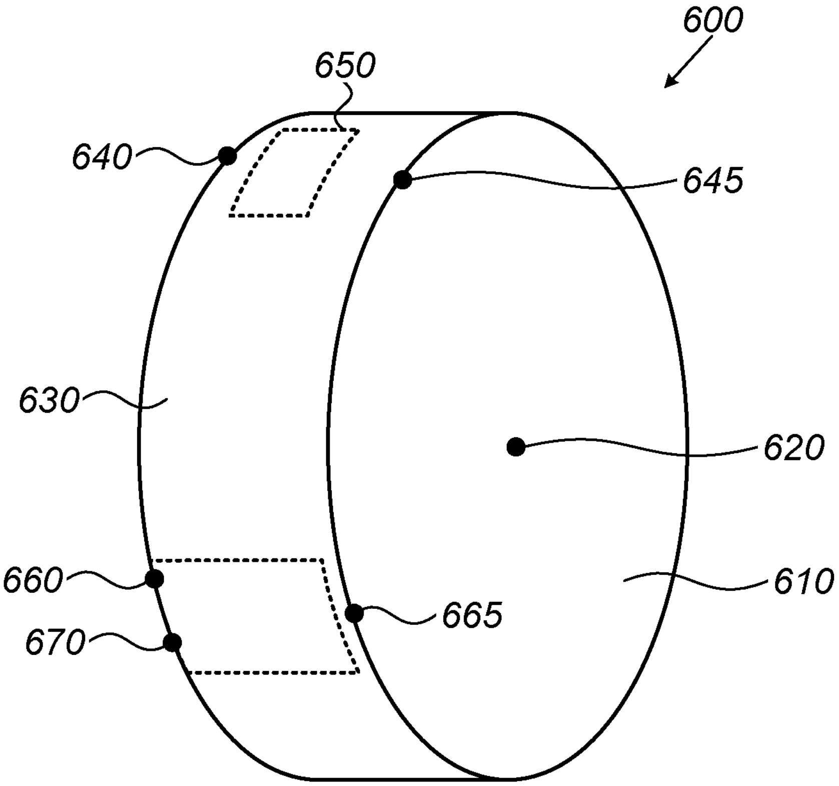
FIG. 6 shows a rotatable drum for performing a printing enhancement task, according to exemplary embodiments of the subject matter.

FIG. 6 shows a rotatable drum for performing a printing enhancement task, according to exemplary embodiments of the subject matter. The rotatable drum 600 comprises a top surface 610, a bottom surface (not shown) and a circumference 630. The circumference 600 may be defined by an axis 620 located in the center of the top surface 610. The axis 620 may define the rotational movement of the rotatable drum 600, for example by having a rotating rod (not shown) that moves the rotatable drum 600. The rotating rod may be connected to a drum actuation mechanism that moves the rotatable drum 600 at a rotational movement.

The circumference 630 is configured to carry the substrates. The rotatable drum 600 comprises a securing mechanism for securing the substrates to the circumference 630 during the printing enhancement process. The securing mechanism may be a pair of grippers for holding the substrate from both sides. The pair of grippers is connected to the rotatable drum 600, either to the circumference 630 or to the top and bottom surfaces. For example, first pair of grippers 640 and 645 secures first substrate 650.

In some exemplary embodiments, the circumference 630 may be used to carry multiple substrates concurrently. The number of substrates may depend on the size of the substrate, the number of grippers, configuration of the securing mechanism, number of printing enhancement modules and the like. For example, the circumference 630 may carry first substrate 650 and second substrate 670. The first substrate 650 may be placed near a printing enhancement module that dispenses glitter materials onto the first substrate 650, and the second substrate 670 may be placed near a printing enhancement module that emits radiation to cure a material dispensed onto the second substrate 670. The second substrate 670 is secured to the circumference 630 by a second pair of grippers 660 and 665. The grippers 640, 645, 660, 665 may move to secure and release the substrates 650, 670 to and from the circumference 630. In some exemplary embodiments, each of the grippers 640, 645, 660, 665 may be associated with a gripper actuator for moving the grippers from one position to another.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A printing enhancement system, comprising multiple printing enhancement modules configured to perform a printing enhancement operation on a substrate;

a drum configured to carry the substrate, said drum is connected to a drum actuation mechanism configured to move the drum at a rotational movement between multiple printing enhancement stations, each of the multiple printing enhancement stations is associated with one of the multiple printing enhancement modules; and a processing module coupled to the drum actuation mechanism and to the multiple printing enhancement modules, wherein the processing module sends commands to the drum actuation mechanism to move the drum and sends commands to the multiple printing enhancement modules to dispense the materials according to a printing enhancement task;

wherein the multiple printing enhancement modules are arranged around a circumference of the drum, wherein the rotational movement enables to bring the substrate closer to a selected printing enhancement module of the multiple printing enhancement modules, and wherein a number of revolutions applied by the drum depends on a number of the multiple printing enhancement.

2. The printing enhancement system of claim 1, further comprises a printing enhancement module actuator configured to move at least one of the multiple printing enhancement modules.

3. The printing enhancement system of claim 1, wherein the drum comprises a top surface, a bottom surface and the circumference, wherein an axis of the rotational movement is perpendicular to the top surface.

4. The printing enhancement system of claim 3, wherein the multiple printing enhancement modules are arranged within a predefined distance from a center of the top surface.

5. The printing enhancement system of claim 3, wherein the top surface is of a circular shape.

6. The printing enhancement system of claim 1, wherein the substrate is secured to the circumference of the drum.

7. The printing enhancement system of claim 6, further comprises grippers configured to grip the substrate to the circumference of the drum.

8. The printing enhancement system of claim 6, further comprises a suction unit configured to suck air from apertures located at the circumference of the drum.

9. The printing enhancement system of claim 1, wherein the multiple printing enhancement modules comprise one or more inkjets and one or more curing modules.

10. The printing enhancement system of claim 9, wherein the one or more inkjets comprise an adhesive printer.

11. The printing enhancement system of claim 9, wherein the one or more inkjets comprise a color printer.

12. The printing enhancement system of claim 1, further comprising a priming station configured to prime the substrate.

13. The printing enhancement system of claim 1, further comprises an input tray for inputting substrates into the drum.

14. The printing enhancement system of claim 13, further comprising an output tray for receiving the substrate after the printing enhancement task is complete.

15. The printing enhancement system of claim 14, further comprising a duplex module coupled to the output tray, said duplex module is configured to receive the substrate after the printing enhancement task is complete on one side of the substrate, and transfer the substrate to the input tray in a manner that enables to perform the printing enhancement task on a second side of the substrate.

16. The printing enhancement system of claim 1, wherein at least one of the multiple printing enhancement modules is a digital printing module.

17. The printing enhancement system of claim 1, wherein at least one of the multiple printing enhancement modules is a foil-based printing module.

* * * * *